United States Patent [19]
Kang et al.

[11] Patent Number: 5,512,736
[45] Date of Patent: Apr. 30, 1996

[54] AUTO-LOAD IMPEDANCE MATCHING DEVICE OF A MICROWAVE OVEN

[75] Inventors: Hyoung J. Kang, Kyungki-do; Young M. Lee, Incheon-si; Joon S. Choi, Seoul, all of Rep. of Korea

[73] Assignee: Goldstar Co., Ltd., Seoul, Rep. of Korea

[21] Appl. No.: 311,017

[22] Filed: Sep. 23, 1994

[30] Foreign Application Priority Data

| Sep. 23, 1993 | [KR] | Rep. of Korea | 1993-19490 |
| Sep. 28, 1993 | [KR] | Rep. of Korea | 1993-20065 |
| Nov. 12, 1993 | [KR] | Rep. of Korea | 1993-23791 |
| Feb. 16, 1994 | [KR] | Rep. of Korea | 1994-2735 |

[51] Int. Cl.$^6$ ............................. H05B 6/74
[52] U.S. Cl. ............ 219/750; 219/704; 219/751; 219/754
[58] Field of Search ............... 219/704, 750, 219/751, 696, 706, 708, 709, 754

[56] References Cited

U.S. PATENT DOCUMENTS

| 3,521,019 | 7/1970 | White | 219/751 |
| 4,179,595 | 12/1979 | Chiron | 219/750 |
| 5,347,108 | 9/1994 | Minakawa et al. | 219/696 |
| 5,360,965 | 11/1994 | Ishii et al. | 219/705 |

FOREIGN PATENT DOCUMENTS

| 457948 | 11/1991 | European Pat. Off. | 219/750 |
| 53-131545 | 11/1978 | Japan | 219/750 |

*Primary Examiner*—Philip H. Leung

[57] ABSTRACT

This invention relates to a microwave oven which can generate and transfer maximum microwave power to food being cooked irrespective of the weight and size of that food being cooked, thereby shortening cooking time and improving the efficiency of cooking. The microwave oven includes a sensor for sensing the food load on a turntable in a heating chamber, a microcomputer for controlling the oven in response to key signals input by the user and in response to the load sensor, a power supply for supplying power to a magnetron to operate the magnetron under the control of the microcomputer, an impedance matching device for matching impedance by moving a reflector in a waveguide fixed to the heating chamber, a match driver for controlling the impedance matching device under the control of the microcomputer, a variable vane mounted in an opening of the heating chamber, and a variable vane driving means for rotating the variable vane under the control of the microcomputer.

7 Claims, 12 Drawing Sheets

FIG.1 PRIOR ART

FIG.2 PRIOR ART maximum output

AUTO-LOAD IMPEDANCE MATCHING DEVICE OF A MICROWAVE OVEN

FIELD OF THE INVENTION

This invention relates to an auto-load impedance matching device of a microwave oven, more particularly to an auto-load impedance matching device of a microwave oven which can generate maximum power transfer to the food by impedance matching according to the weight and size of food.

BACKGROUND OF THE INVENTION

Figure 1:
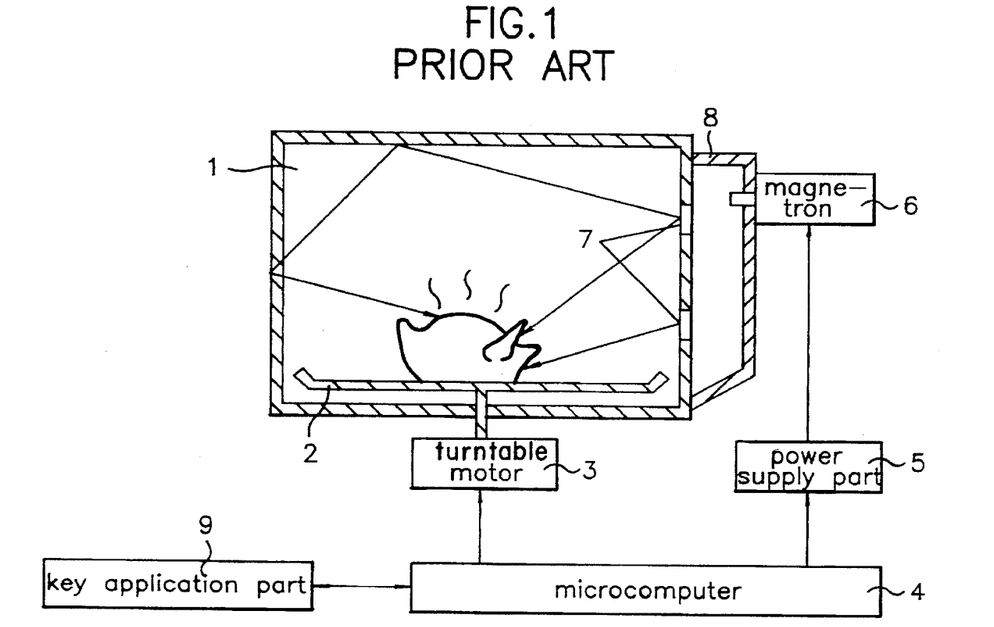
FIG. 1 shows a prior art microwave oven.

As shown in FIG. 1, a conventional microwave oven includes a heating chamber 1 for cooking food, a turntable 2 positioned in the chamber for supporting the food, a turntable motor 3 for turning the turntable, a key application part 9 having keys for a user to select cooking functions, a microcomputer 4 for controlling the microwave oven according to the key signals applied from the key application part 9, a magnetron 6 for generating microwaves, a power supply part 5 for supplying power to the magnetron 6 to operate the magnetron 6 under control of the microcomputer 4, and a waveguide 8 for transmitting the microwaves generated in the magnetron 6 to the heating chamber 1 through an opening 7 formed in the wall of the heating chamber 1.

Operation of the foregoing conventional microwave oven is as follows.

First, when a user puts food on the turntable 2 in the heating chamber 1 and presses keys selected to carry out a desired cooking function through the key application part 9 for cooking, the microcomputer 4 controls the turntable motor 3 to turn the turntable 2 and, at the same time, controls the power supply part 5 to supply power to the magnetron 6.

Upon supplying power to the magnetron 6, microwaves are generated and transmitted to the heating chamber 1 through the opening 7 and the waveguide 8 to cook the food.

However, the conventional microwave oven generates microwaves at different outputs and with different efficiencies depending on the load of food in the oven.

Figure 2:
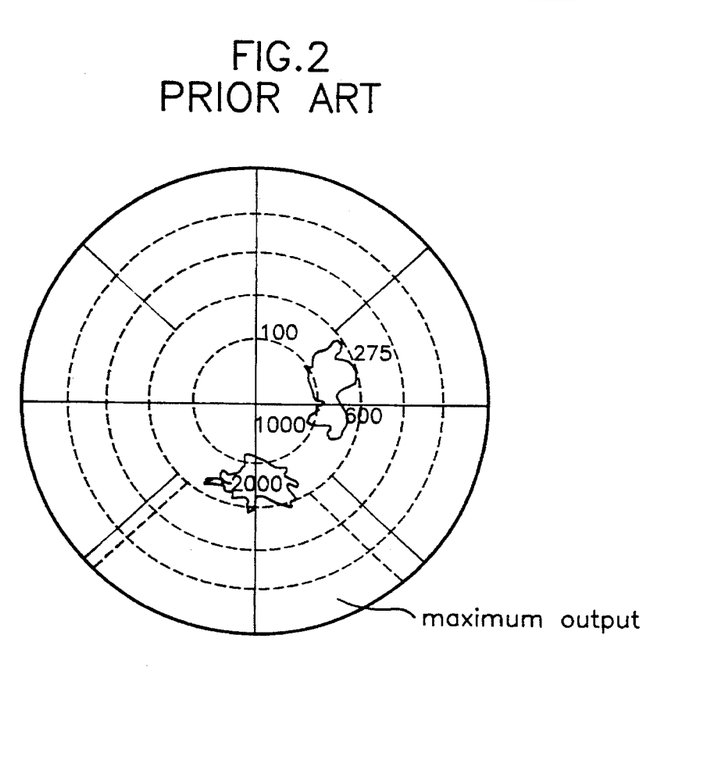
FIG. 2 shows the output efficiency relationship versus food load change in a prior art microwave oven.

For example, as shown in FIG. 2, if a microwave oven is designed to have an output of 700 W and an efficiency of 50% for 2000 cc of food, the output of the microwave oven will fall to 660 W and the efficiency will drop to 46% for a food load of 1000 cc, and the output of the microwave oven will fall to 610 W and the efficiency will drop to 38% for a food load of 500 cc. Therefore, there has been a problem that an optimum cooking condition can not be obtained when the food load in the oven varies.

SUMMARY OF THE INVENTION

The object of this invention is to solve the foregoing problem. The solution to the problem is to provide an auto-load impedance matching device for a microwave oven which can provide optimum cooking conditions irrespective of the weight and size of food by impedance matching for maximum power transfer of microwaves from the microwave source to the food in the heating chamber.

This and other objects and features of this invention can be achieved by providing an auto-load matching impedance device of a microwave oven including: a load sensing means for sensing the load of food put on a turntable in a heating chamber; a microcomputer for controlling the oven in response to key signals applied by a user and to an output of the load sensing means; a power supply means for supplying power to a magnetron to operate the magnetron under the control of the microcomputer; an impedance matching means for impedance matching of source/load impedances by moving the position of the impedance matching means in a waveguide fixed to the heating chamber to thereby transfer maximum power from the microwave source to the food; a match driving means for controlling driving of the impedance matching means under the control of the microcomputer; a variable vane, mounted in an opening of the heating chamber, which is rotated for uniform heating of the food; and a variable vane driving means for rotating the variable vane under control of the microcomputer. Alternatively, there is provided an auto-load impedance matching device of a microwave oven including a load sensing means for sensing the load of food put on a turntable in a heating chamber, a microcomputer for controlling the oven in response to key signals input by the user and according to the output of the load sensing means, a waveguide for transmitting the microwaves generated in the magnetron into the heating chamber and a load impedance matching means mounted at one side of the waveguide for adjusting, under the control of the microcomputer, the impedance of the load by controlling the direction of irradiation of microwaves.

DETAILED DESCRIPTION OF THE INVENTION

Figure 3:
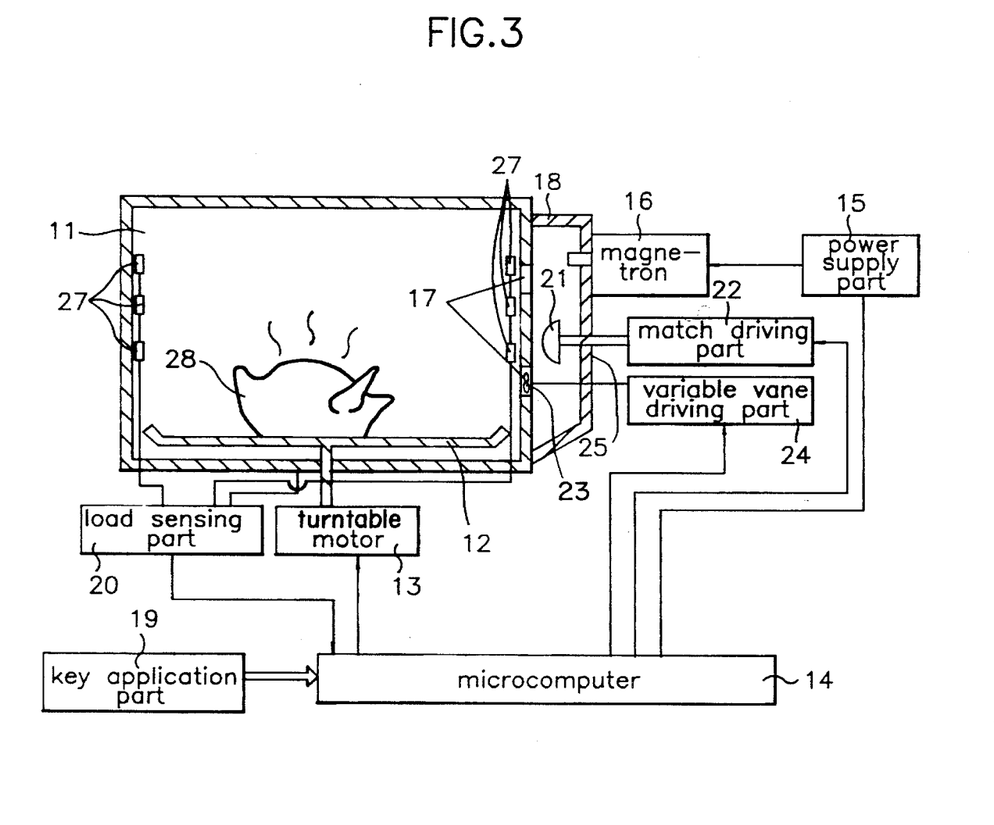
FIG. 3 is an auto-load impedance matching device in accordance with one embodiment of this invention.

As shown in FIG. 3, an auto-load impedance matching device of a microwave oven in accordance with an embodiment of the invention includes a microcomputer 14, a power supply part 15, a load sensing part 20, a impedance matching part 21, a match driving part 22, a variable vane 23, and a variable vane driving part 24.

The load sensing part 20 includes optical sensors 27 and a weight sensor 28 for sensing the volume and weight, respectively, of food on the turntable 12 in the heating chamber 11. A plurality of optical sensors 27 are arranged opposite one another in the heating chamber 11 to roughly sense the volume of the food on the turntable.

The microcomputer 14 controls the oven according to the output of the load sensing part 20 and key signals applied by the user through the key application part 19.

Power supply part 15 supplies power to the magnetron 16 to operate the magnetron 16 under control of the microcomputer 14.

Impedance matching part 21 is moved within waveguide 18 which is fixed to the heating chamber 11 to match the impedance of the load to that of the magnetron to generate microwaves at maximum output under control of the microcomputer 14.

Figure 4:
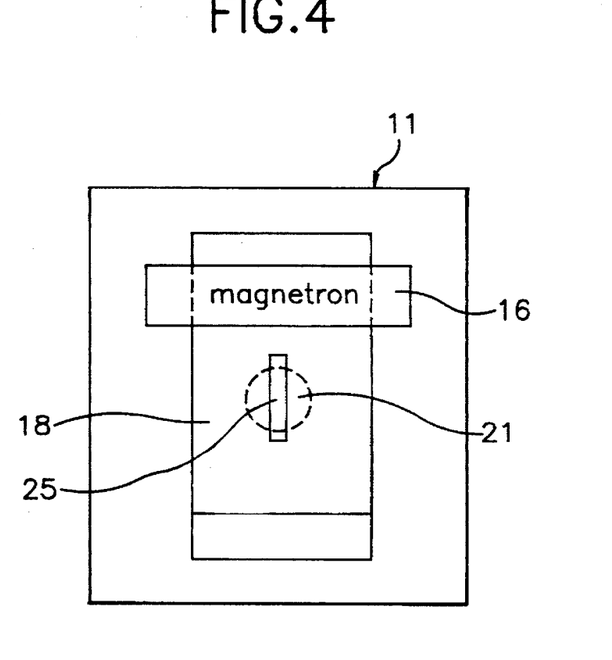
FIG. 4 shows details of the impedance matching part 21 of FIG. 3.

As shown in FIG. 4, the impedance matching part 21, having a guide part 25 for guiding its position, moves in the vertical direction on the waveguide 18 along the guide part 25.

The match driving part 22 controls operation of the impedance matching part 21 under the control of the microcomputer 14. Referring to FIG. 3, the variable vane 23, positioned in the opening 17 of the heating chamber 11, rotates to cause the microwaves to heat the food uniformly, and the variable vane driving part 24 rotates the variable vane 23 under the control of the microcomputer 14.

Operation of the foregoing auto-load impedance matching device of a microwave oven in accordance with the above-embodiment of the invention will now be described.

First, when a user presses keys at the key application part 19 to select functions for cooking food on the turntable 12 in the heating chamber 11, the microcomputer 14 operates the turntable motor 13 to turn the turntable 12 having the food thereon. At the same time, the microcomputer 14 controls the power supply part 15 to supply power to the magnetron 16 to generate microwaves.

Accordingly, microwaves pass through opening 17 and are guided to the heating chamber 11 by waveguide 18 to heat the food on the turntable 12.

Sensors 28 of the load sensing part 20 sense the weight or the weight and size of the food put on the turntable 12 and apply the result to the microcomputer 14. According to the result of the sensing, microcomputer 14 controls the match driving part 22 and the variable vane driving part 24 to drive the impedance matching part 21 and the variable vane 23, respectively, to impedance match the load to that of the magnetron 16.

Figure 5:
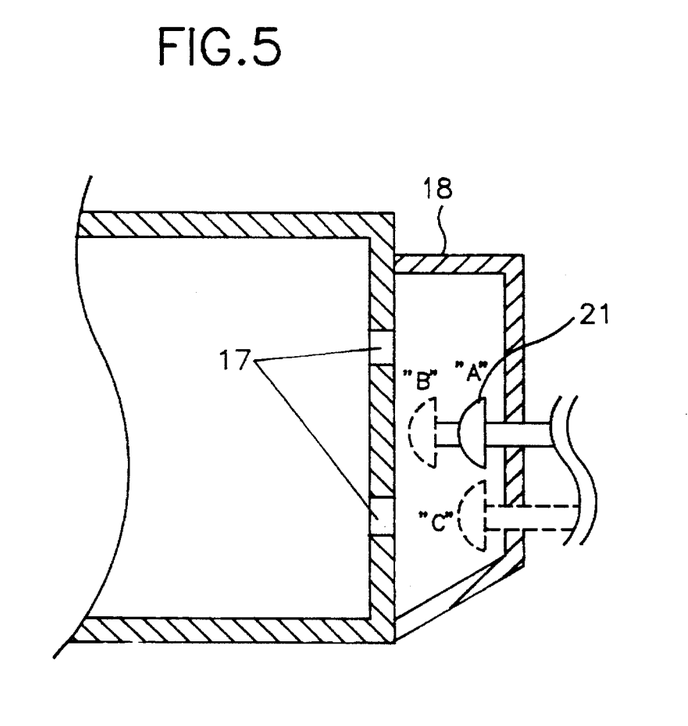
FIG. 5 shows a change of position of the impedance matching part 21 of FIG. 3.

That is, in the case of the weight of the food sensed at the weight sensor 28 of the load sensing part 20 being 2000 g, the microcomputer 14 controls the matching part 21 to move it to a fixed position "A" for maximum output of the magnetron 16 with a 2000 g food load, as shown in FIG. 5. And in the case of the weight of the food being 1000 g, the impedance matching part 21 is moved to a fixed position "B" for maximum output of the magnetron 16 with a 1000 g food load, and in the case of the weight of the food being 500 g, the impedance matching part 21 is moved to a fixed position "C" for maximum output of the magnetron with a 500 g food load. Herein, the impedance matching part 16 is provided to move the position of matching part 21 through mechanical parts, such as the match driving part 22 and a cam, and can be provided to mechanically interlock with the variable vane 23 by cams and gears.

Figure 6:
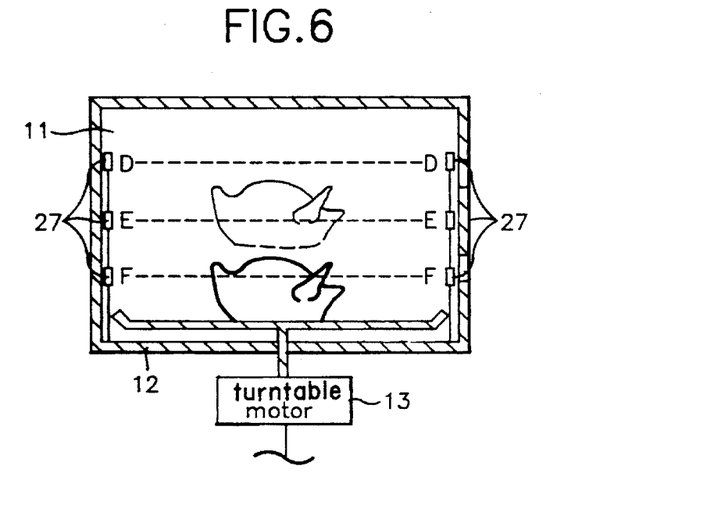
FIG. 6 shows positions of optical sensors 27 of FIG. 3.

While the weight sensor 28 of the load sensing part 20 is sensing weight of the food on the turntable 12, the optical sensors 27 roughly sense the volume of the food, as shown in FIG. 6 and apply the results of the sensing to the microcomputer 14.

That is, light emission parts D, E, and F, and light reception parts D', E', and F' are provided at respective, opposite sides of the heating chamber 11 in the vertical direction, wherein light emitted from the light emission parts D, E, and F at one side of the heating chamber are received by the respective light reception parts D', E', and F' at the opposite side thereof to categorize the volume of the food on the turntable 12.

According to the outputs of optical sensors 27 of the load sensing part 20, the microcomputer 14 controls the variable vane driving part 24, either to hold fixed or to rotate the variable vane 23, and thereby to heat the food uniformly which, thereby, improves the efficiency of heating.

Figure 7A:
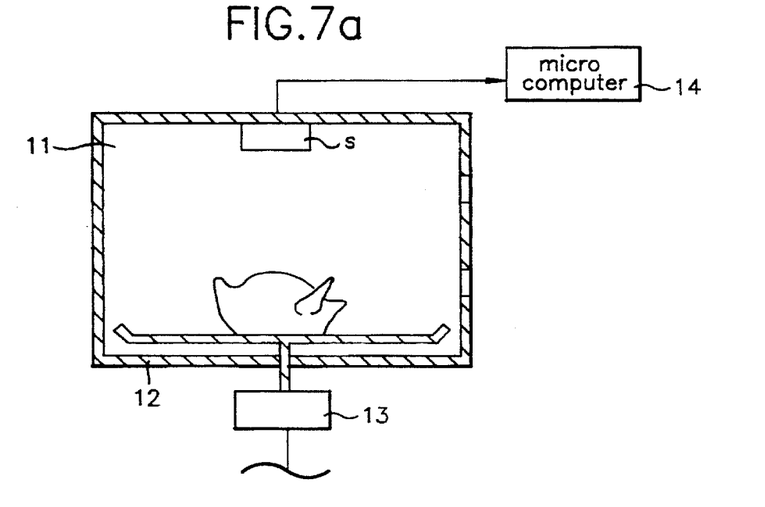
FIG. 7A shows another embodiment of the invention wherein the load sensing part 20 of FIG. 3 is a dielectric constant sensor.
Figure 7B:
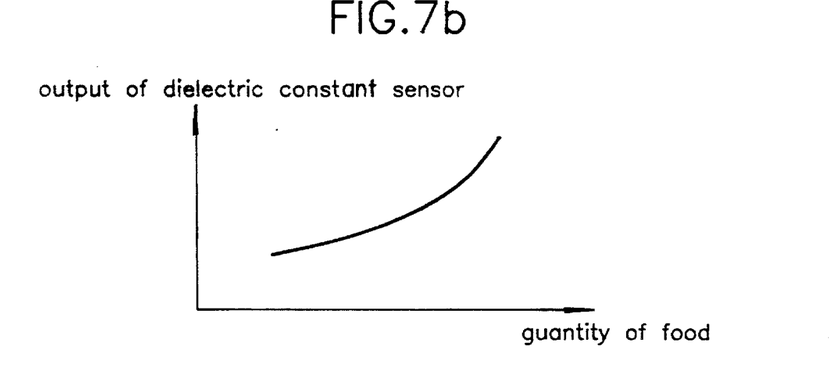
FIG. 7B shows the output versus quantity of food for the dielectric constant sensor used in the embodiment of FIG. 7A.

The load sensing part 20 (FIG. 8) may instead comprise a dielectric constant sensor S, which utilizes the output of the dielectric constant sensor S to infer the quantity of the food in the heating chamber, as shown in FIG. 7(b). Since the intensity of the microwaves which can be sensed by the dielectric constant sensor S varies with quantity of foods in the heating chamber, quantity of the food in the heating chamber can be calculated from the output of sensor S.

Therefore, the microcomputer 14 converts the signals sensed at, and received from, the dielectric constant sensor S into weight of the food, and, utilizing this, controls the impedance matching part 21 and the variable vane 23 to move to an impedance matching position so that microwaves can be generated at maximum output.

Figure 8:
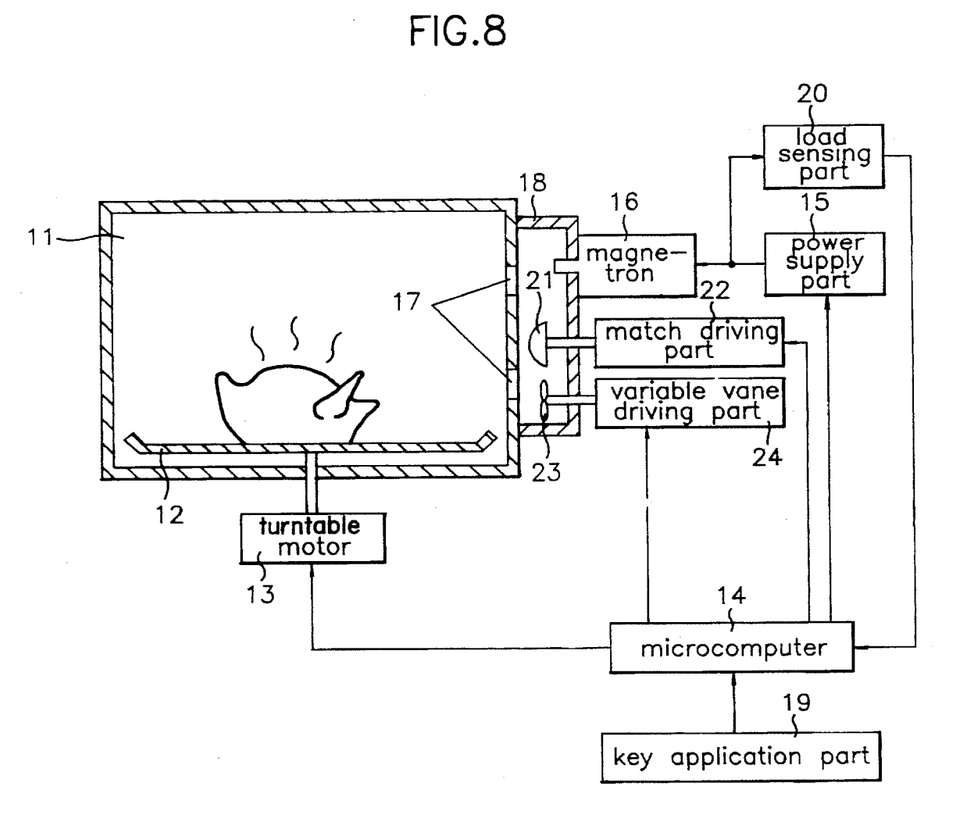
FIG. 8 is an auto-load impedance matching device in accordance with another embodiment of the invention.

As shown in FIG. 8, an auto-load impedance matching device of a microwave oven in accordance with another embodiment of the invention includes a microcomputer 14, a power supply part 15, a load sensing part 20, a impedance matching part 21, a match driving part 22, a variable vane 23, and variable vane driving part 24.

Herein, the systems and operations of the microcomputer 14, the power supply part 15, the impedance matching part 21, the match driving part 22, the variable vane 23, and the variable vane driving part 24 are the same as that of the auto-load impedance matching device of the first embodiment of the invention.

Figure 9:
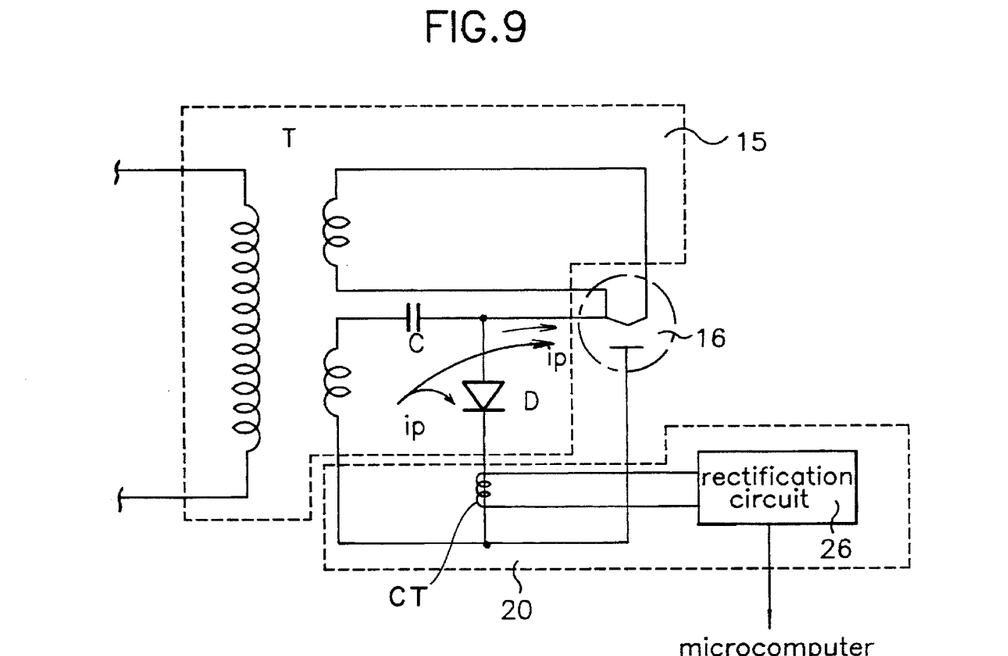
FIG. 9 shows details of the load sensing part of FIG. 8.

As shown in FIG. 9, the load sensing part 20 includes a current transformer CT for sensing change of a load current "ip" supplied from the power supply part 15 to the magnetron 16, and a rectification circuit 26 for rectifying a load current "ip" sensed at the current transformer CT into direct current and supplying the rectified current to the microcomputer 14, thereby sensing change of load by detecting change of the current supplied from the power supply part 15 to the magnetron 16, and applying the detected current change to the microcomputer 14 (FIG. 8).

Operation of the auto-load impedance matching device of a microwave oven in accordance with another embodiment of the invention will now be explained.

First, when a user presses keys at the key application part 19 (FIG. 3) to select functions for cooking the food on the turntable 12 in the heating chamber 11, the microcomputer 14 operates the turntable motor 13 to turn the turntable 12 having the food thereon. At the same time, the microcomputer 14 controls the power supply part 15 to supply power to the magnetron 16 to generate microwaves. The microwaves, generated in the magnetron 16, are transmitted to the heating chamber 11 through the opening 17 and guided by the waveguide 18 to heat the food on the turntable 12.

While cooking proceeds, the load sensing part 20 senses change of load in the heating chamber (based on the kind and weight of the food) and applies the load change data to the microcomputer 14. The microcomputer 14, based on the result of the sensing of load change data applied thereto, controls the match driving part 22 and the variable vane driving part 24 to always supply a constant maximum output by minimizing the change of impedance (i.e., the change in output of microwaves irrespective of the kind and/or weight of the food), thereby providing the impedance matching part 21 and the variable vane driving part 24 with an optimum impedance for maximum power transfer irrespective of food load.

Processes for sensing a load at the load sensing part 20 will now be explained in detail, referring to FIG. 9.

High voltage current induced on the secondary winding of a power transformer T is rectified and smoothed through a condenser C and a diode D and supplied to the magnetron 16. The load current "ip" supplied to the magnetron 16 is sensed at a current transformer CT and transmitted to a rectification circuit 26. That is, the load current "ip" supplied to the magnetron 16 through the power transformer T is rectified through the diode D, and current "ip'" in a rectification loop received from the diode D is sensed at the current transformer CT to sense change of the load current "ip".

The reason for detecting the current "ip'" flowing through the diode D is that the load current "ip" flowing through the magnetron 16 is proportional to the current "ip'" flowing through the diode D. That is, since the load current "ip" flowing through the magnetron 16 is proportional to the load current "ip'" flowing through the diode, even though the current "ip'" flowing through the diode D is measured with the current transformer CT, this is equivalent to measuring the load current "ip" flowing through the magnetron 16.

The current "ip'" received from the current transformer CT is rectified into direct current at a level corresponding to an increment of load change at the rectification circuit 26 and applied to the microcomputer 14.

The microcomputer 14 detects the level of direct current received from the rectification circuit 26 to determine increment of load change and, based on the determined increment of load change, controls the match driving part 22 and the variable vane driving part 24 to achieve an optimum efficiency through driving the impedance matching part 21 and the variable vane 23.

Figure 10:
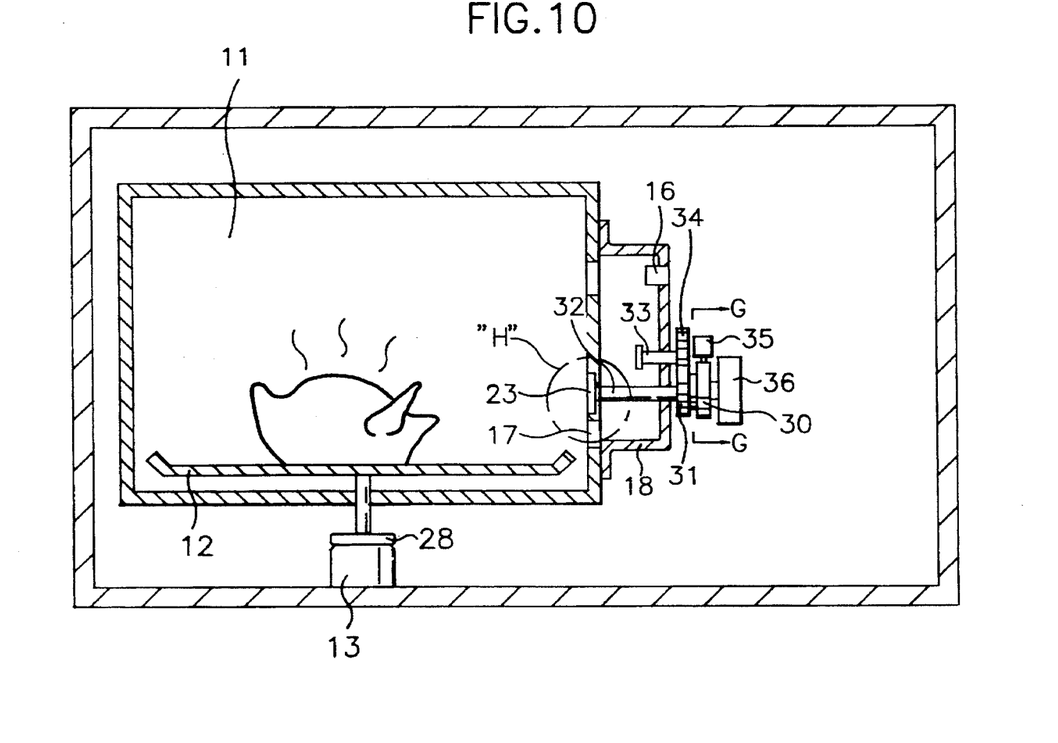
FIG. 10 shows details of an embodiment of the variable vane driving part 23 of FIG. 3.
Figure 11:
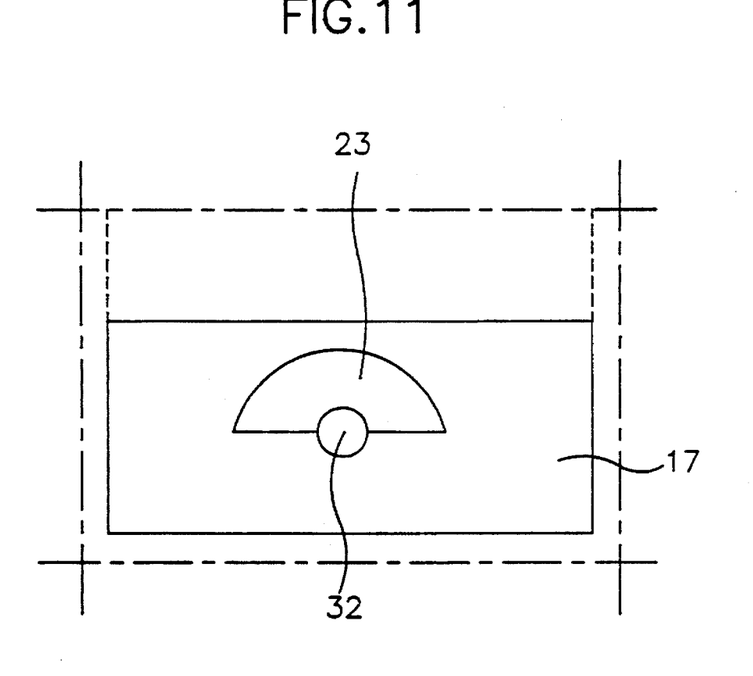
FIG. 11 shows a longitudinal section of the H part of FIG. 10.
Figure 12:
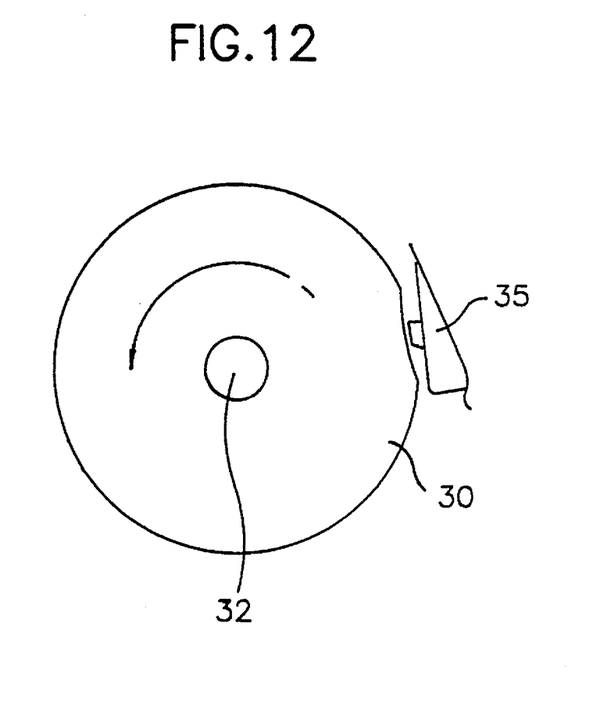
FIG. 12 is front view showing operation of the cam 30 of FIG. 10.

As shown in FIGS. 10–12, one embodiment of the variable vane driving part 24 for driving the variable vane 23 includes a motor shaft 32 penetrating the waveguide 18 (the waveguide being fixed to the heating chamber 11 and having the variable vane 23 fixed at one end thereof). A motor 36 is connected to the motor shaft 32 for transmitting power, and a cam 30 is mounted on the motor shaft 32 between the motor 36 and the waveguide 18. A microswitch 35 is attached to cam 30 for sensing turn on/off, or lapse of a certain period of time after turn off of the motor, to stop the motor shaft 32 at a particular angle upon operation of the motor 36. A movable stub 33 having a follower gear 34 attached thereon is engaged to a driving gear 31 mounted on the motor shaft 32 for moving the movable stub back and forth.

That is, a motor shaft 32 connected to a motor 36 is provided penetrating a waveguide 18 fixed to one side of a heating chamber 11. A variable vane 23, rotated by the motor shaft 32, is provided at the end thereof to position the variable vane in an opening 17 provided at a lower part of one side of the heating chamber 11. Both a cam 30 and a driving gear 31, rotated by the motor 36, are mounted on the motor shaft 32 between the motor 36 and the waveguide 18.

At the end of a movable stub 33, which moves back and forth and is positioned above the motor shaft 32, there is provided a follower gear 34 rotatably engaged to a driving gear 31. Also, a microswitch 35 is provided that senses turn on/off, or lapse of a certain period of time after turn off, of the motor 36 and stops the motor 36 at a particular angle following operation of the motor 36.

Figure 13A:
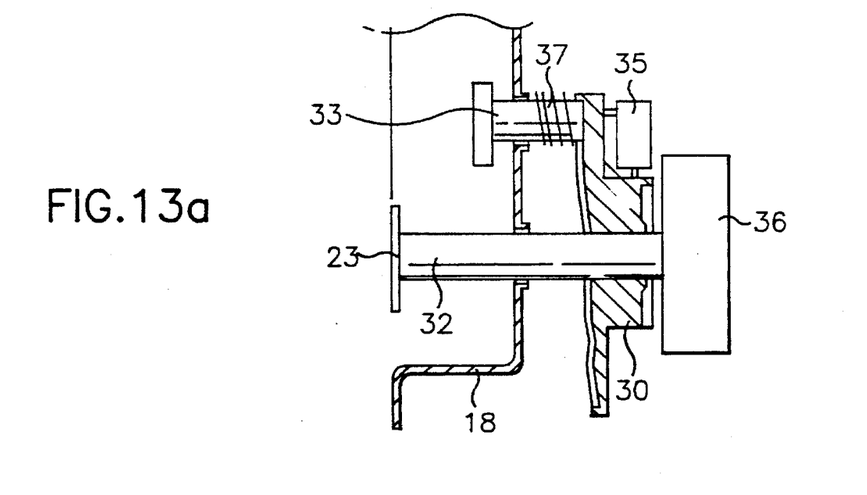
FIGS. 13(a)–13(c) show details of another embodiment of the variable vane driving part 23 of FIG. 3.
Figure 13B:
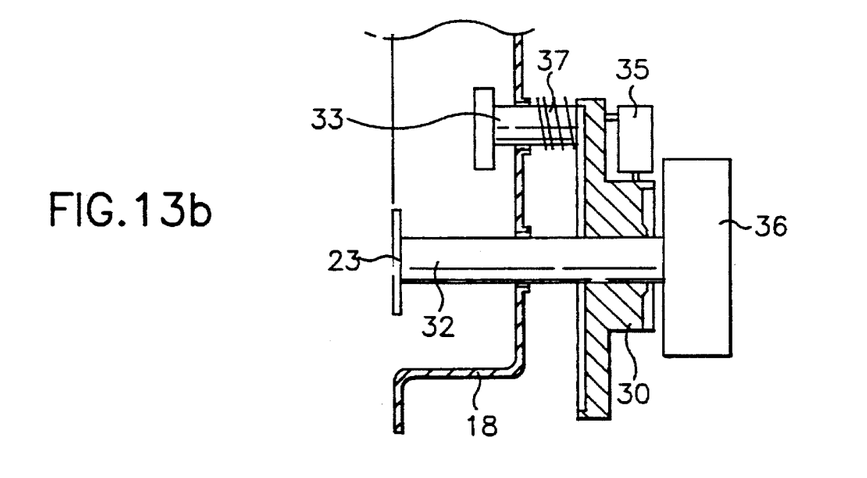
Figure 13C:
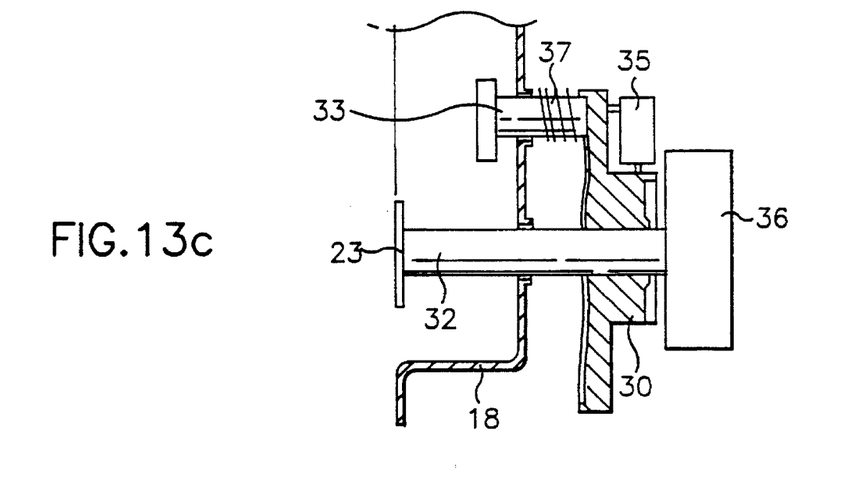

Shown in FIGS. 13(a)–13(c) is another embodiment of a variable vane driving part 24, including a cam 30 mounted on a motor shaft 32 between the waveguide 18 and a motor 36, a movable stub 33 positioned above the cam 30 and penetrating waveguide 18 above the motor shaft 32, a spring 37 mounted on the movable stub 33 between the waveguide 18 and the cam 30 for biasing the moveable stub 33 toward the cam 30, and a microswitch 35 positioned above the cam 30.

Figure 14A:
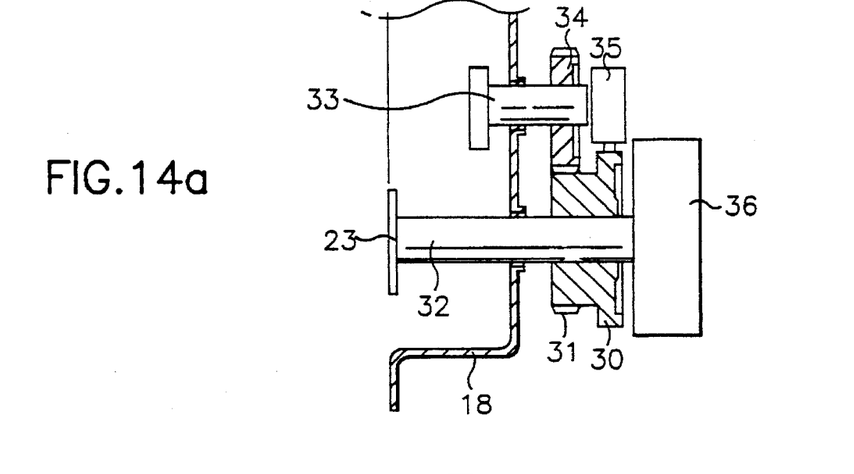
FIGS. 14(a)–14(c) show another embodiment of the variable vane driving part 23 of FIG. 3.
Figure 14B:
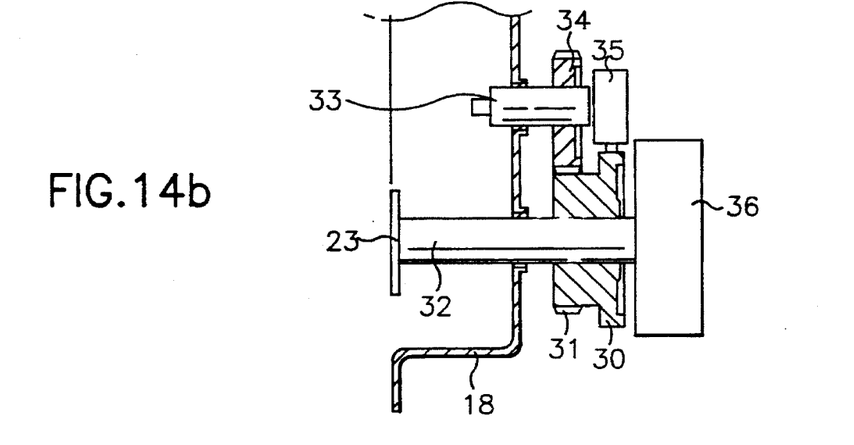
Figure 14C:
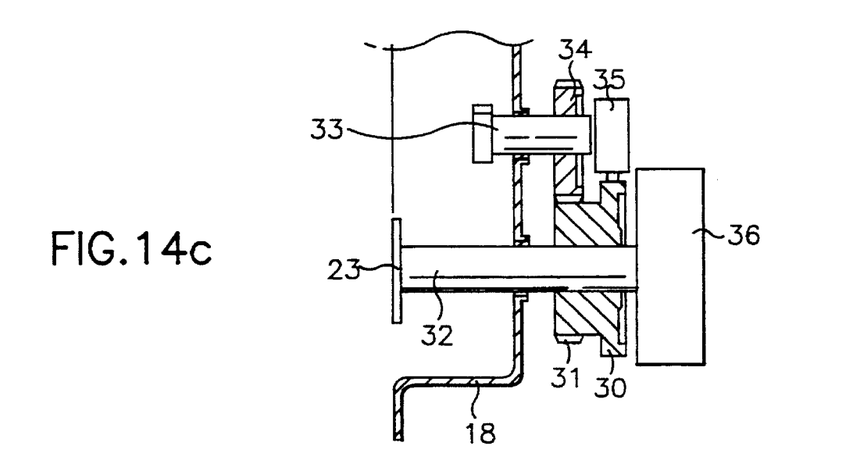

Shown in FIGS. 14(a)–14(b) is another embodiment of a variable vane driving part 24, including a cam 30 integrated with a driving gear mounted on a motor shaft 32 between the waveguide 18 and the motor 36. A follower gear 34 is positioned at the end of the movable stub 33 and both the gear 34 and movable stub 33 are positioned above the motor shaft 32 penetrating the waveguide 18. Rotatably engaged to the cam 30, there is a microswitch 35 positioned above the cam 30.

The position of the movable stub 33 or the angle of the variable vane 23 can be controlled according to various classifications of weight and size of the food on the turntable 12 in the heating chamber 11. For example, 3 to 4 categories of positions for backward/or forward movement of the movable stub 33, or various combinations of positions of the moveable stub and angles of the variable vane 23, can be stored in a memory in advance to perform the impedance matching needed to provide optimum power transfer between the microwave source and the load. Thus, the microcomputer 14 utilizes the scored memory data to achieve maximum power for cooking, irrespective of the cooking load.

That is, by making the microcomputer 14 control the motor 36 to match the position of the movable stub 33, or to match the angle of the variable vane 23 and by using the microswitch 35 to signal a step corresponding to the weight and size of food sensed at the load sensing part 20, it is possible to maintain the maximum transfer of microwaves to the food in the oven, thereby improving the cooking efficiency.

Figure 15:
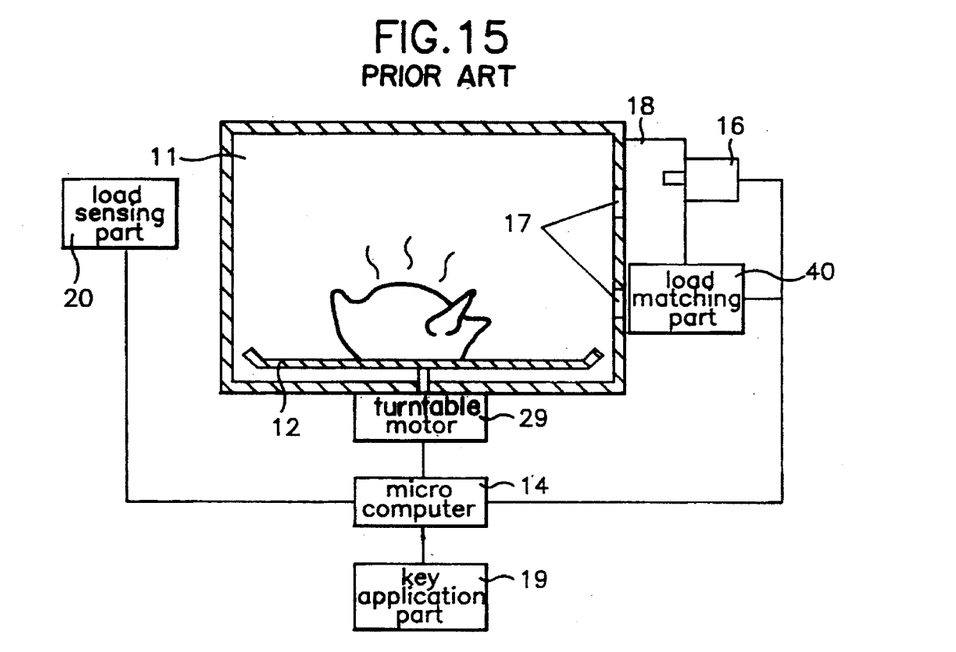
FIG. 15 is an auto-load impedance matching device in accordance with another embodiment of the invention.

Shown In FIG. 15 is an auto-load impedance matching device of a microwave oven in accordance with another embodiment of the invention, including a load sensing part 20, a microcomputer 14, a waveguide 18, and a load impedance matching part 40.

The load sensing part 20 senses the load of food put on a turntable 12 in a heating chamber 11, and the microcomputer 14 controls the oven according to the result of the load sensing of the load sensing part 20 and key signals applied by the user through a key application part 19.

The waveguide 18 transmits microwaves generated in a magnetron 16 into the heating chamber 11 under the control of the microcomputer 14.

The load impedance matching part 40, as shown in FIGS. 16–17(a)–17(c), positioned at one side of the waveguide 18, includes a deflection plate 41 for reflecting microwaves, and a control part 45 for controlling the angle of the deflection plate 41. Thus the direction of irradiation of microwaves is controlled by the microcomputer 14.

Figure 17A:
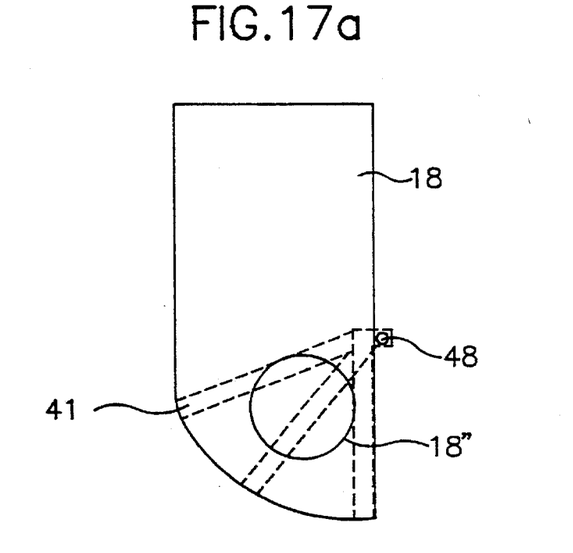
FIG. 17(a) is a side view of the load impedance matching part shown in FIG. 16.
Figure 17B:
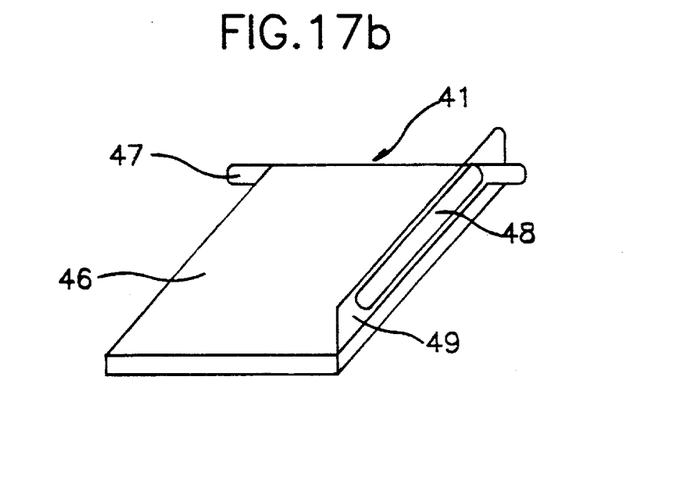
FIG. 17(b) is a perspective view of the deflecting plate of FIG. 16.

Herein, as shown in FIG. 17(b), the deflection plate 41 includes a body plate 46, a turning shaft 47 formed at one side of the body plate 46 and rotatably fixed to a fixing groove 18" formed in the waveguide 18, and a position controlling plate 49 having a position controlling groove 48 inserted into the control part 45 for turning the body plate 46.

Figure 17C:
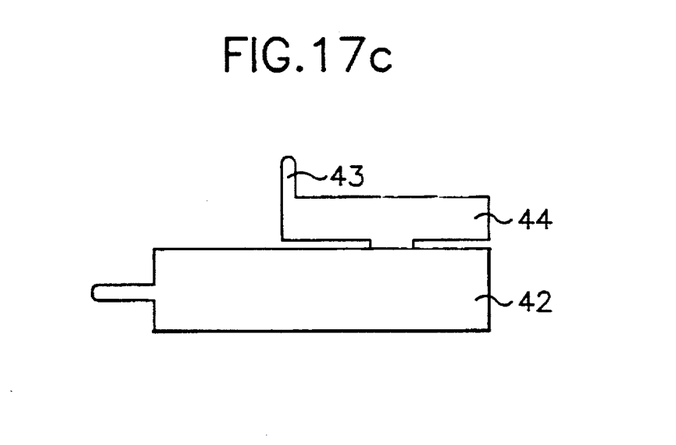
FIG. 17(c) shows the control part of FIG. 16.

And, as shown in FIG. 17(c), the control part 45 includes a motor 42, and a rotator 44 having a projection 43 formed thereon to be inserted into the position controlling groove 48 for rotating deflection plate 41 at a preset angle by the motor 42.

Figure 16:
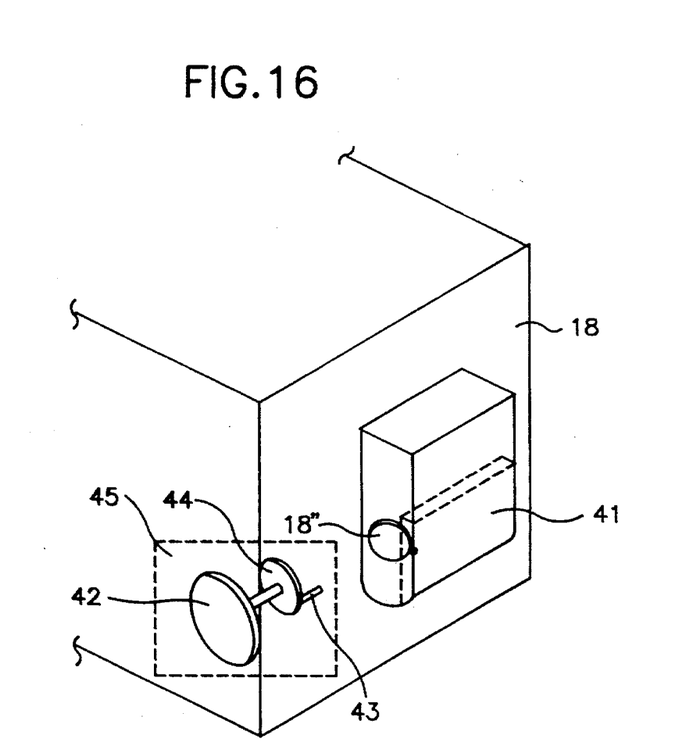
FIG. 16 shows details of the load impedance matching part of FIG. 15.

The waveguide 18 has the fixing groove 18" at one side thereof for inserting the rotator 44, and a bottom part formed in an arc for enabling the deflection plate 41 to be rotated therein.

Operation of the foregoing auto-load impedance matching device of a microwave oven in accordance with another embodiment of the invention will now be described.

When the keys are pressed to select functions for cooking using the key application part 19, the microcomputer 14 operates the turntable motor 13 to rotate the turntable 12 having the food thereon.

The load sensing part 20 then senses the food load on the turntable and applies the result to the microcomputer 14. Accordingly, the microcomputer 14 controls the number of revolutions of the motor 42 through the rotation of the rotator 44, according to the angle of the deflection plate 41 that provides optimum impedance match for transferring power to the load.

Figure 18:
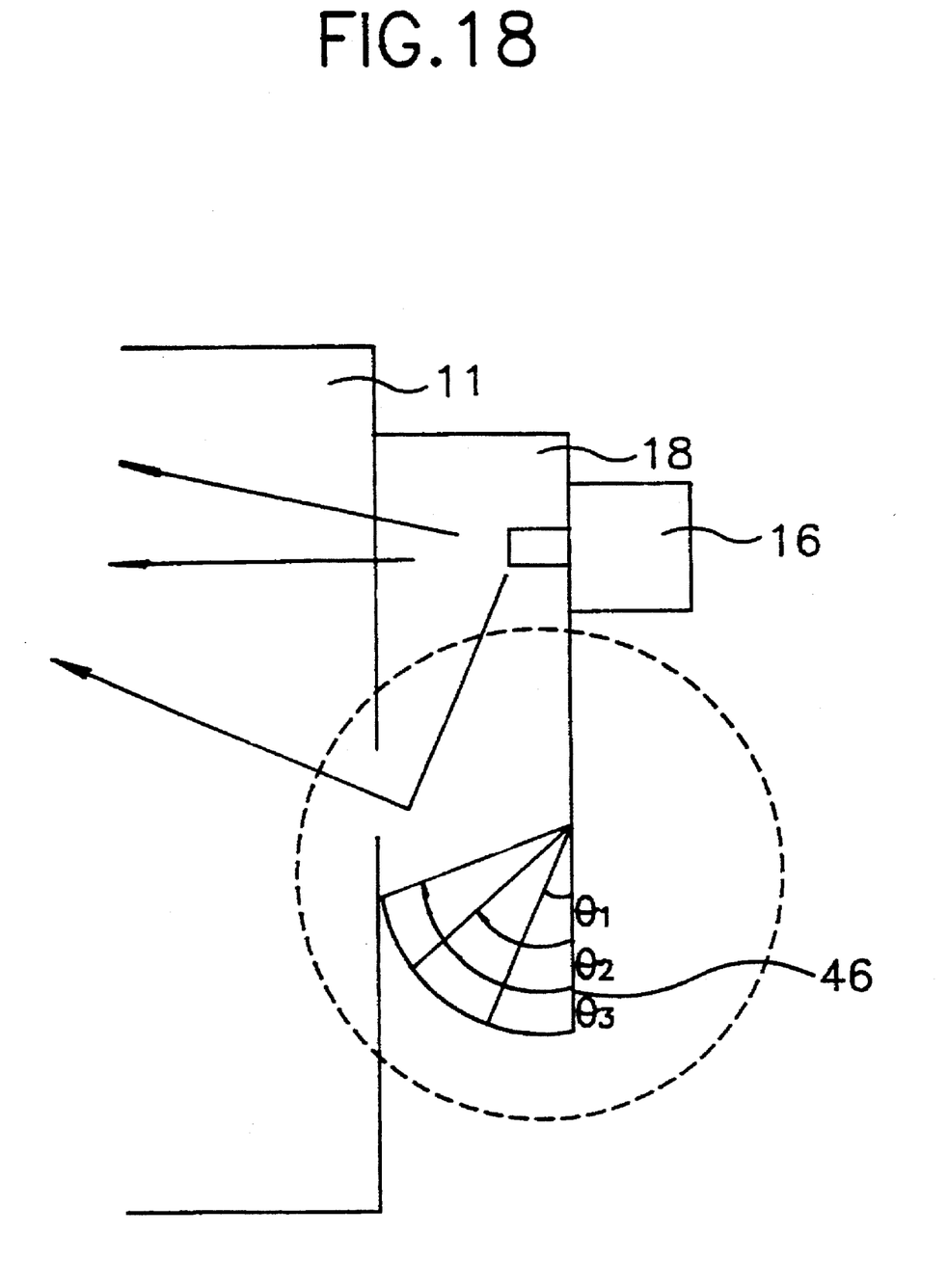
FIG. 18 shows operation of the deflection plate of FIG. 16.

As shown in FIG. 18, following rotation of the rotator 44, the projection 43 of the rotator 44 moves within the position controlling groove 48 of the deflection plate 41, thereby moving the body plate 46 of the deflection plate 41 at designated angles θ1, θ2, and θ3, thereby controlling the position of the deflection plate for an optimum impedance matching condition for the load.

As has been explained, since this invention facilitates achieving maximum microwave output for the load, it provides advantages such as improving cooking efficiency and shortening cooking time and, consequently, it saves energy and improves the reliability of microwave oven cooking.

Although the invention has been described in conjunction with specific embodiments, it is evident that many alternatives and variation s will be apparent to those skilled in the art in light of the foregoing description. Accordingly, the invention is intended to embrace all of the alternatives and variations that fall within the spirit and scope of the appended claims.

What is claimed is:

1. A microwave oven comprising:

a heating chamber having a side wall and a bottom surface;

at least one opening in said side wall of the heating chamber;

a wave guide located at said side wall of the heating chamber;

a turntable mounted above said bottom surface of the heating chamber for placing food thereon, said turntable being rotatable by a turntable driving means located beneath the heating chamber;

key signal input means for receiving external key signals from a user and providing a first output;

load sensing means for sensing a load of food in the heating chamber and providing a second output;

matching means movably mounted in the wave guide;

power supply means;

driving means for moving said matching means;

a microcomputer for controlling the power supply means and the driving means in response to said first and second outputs of the key signal input means and the load sensing means, respectively;

a magnetron driven by the power supply means for generating microwaves to be directed into the heating chamber through the wave guide and through said at least one opening;

a variable vane mounted in one opening of the heating chamber; and a variable vane driving means for turning the variable vane at a predetermined angle under the control of the microcomputer in response to said second output of the load sensing means.

2. The microwave oven as claimed in claim 1, wherein the load sensing means includes optical sensors and a weight sensor.

3. The microwave oven as claimed in claim 2, wherein there is provided means for categorizing a volume of the load of food in the oven, said means for categorizing including optical sensors.

4. A microwave oven as claimed in claim 3, wherein the optical sensors are located at different heights above the turntable.

5. The microwave oven as claimed in claim 1, wherein the matching means has a guide means for guiding its position and moves in the vertical direction of the waveguide along the guide means under control of the driving means.

6. The microwave oven as claimed in claim 1, wherein the variable vane driving means includes:

a motor shaft penetrating the waveguide fixed to the heating chamber, said motor shaft having said variable vane fixed at one end thereof;

a motor connected to the motor shaft for transmitting power;

a cam mounted on the motor shaft between the motor and the waveguide, said cam having a microswitch attached thereon for sensing turn on/off, or lapse of a certain period of time after turn off of the motor, in order to stop the motor at a particular angle after operation of the motor; and a movable stub having a follower gear attached thereon, said movable stub being capable of moving back and forth to thereby change impedance of the waveguide, said follower gear being engaged to a driving gear, and said driving gear being mounted on the motor shaft.

7. The microwave oven as claimed in claim 6, wherein a spring is provided between the cam and the moveable stub for biasing the moveable stub toward the cam.

* * * * *